United States Patent [19]

Aroshidze et al.

[11] 4,289,984
[45] Sep. 15, 1981

[54] LIQUID COOLING OF AN ELECTRIC MACHINE ROTOR WINDING

[76] Inventors: Jury V. Aroshidze, Moskovsky prospekt, 199, kv. 37; Ibragim A. Kadi-Ogly, ulitsa Marshala Zhukova, 64, Korpus 1, kv. 180; Vladimir P. Chernyavsky, Pulkovskaya ulitsa, 17 kv. 185; Aron B. Shapiro, ulitsa Basseinaya, 53 kv. 71; Boris I. Fomin, Petrovskaya ulitsa, 4, korpus 2, kv. 50, all of Leningrad; Anatoly F. Yankov, Detskoselsky prospekt, 1, kv. 63, Pushkin Leningradskoi oblasti, all of U.S.S.R.

[21] Appl. No.: 86,063

[22] Filed: Oct. 18, 1979

[51] Int. Cl.³ .............................................. H02K 9/00
[52] U.S. Cl. ........................................ 310/54; 310/51
[58] Field of Search ................. 310/53, 54, 57, 58, 310/59, 60 R, 60 A, 61, 64, 65

[56] References Cited

U.S. PATENT DOCUMENTS 744,084  11/1903  Macloskie ........................... 310/61
3,579,006  5/1971  Kindl ..................................... 310/54
3,870,913  3/1975  Shapiro ................................. 310/54
3,891,877  6/1975  Shapiro ................................. 310.61/

FOREIGN PATENT DOCUMENTS 236610  6/1969  U.S.S.R. ............................... 310/54
253219  3/1970  U.S.S.R. ............................... 310/54

Primary Examiner—R. Skudy
Attorney, Agent, or Firm—Burgess, Ryan and Wayne

[57] ABSTRACT

A device for collecting the liquid cooling medium of an electric machine rotor winding which comprises an external cylindrical member having an annular recess on its internal surface fastened to the rotor in communication with the cooling medium discharge from the rotor winding, and a stationary internal cylindrical member having an external surface provided with an annular projection, extending into the annular recess of the external cylindrical member, both members being arranged concentrically with a rotor shaft. The annular projection is provided with at least one internal annular cavity open on the circumference of the projection and communicating with the liquid collecting chamber.

4 Claims, 9 Drawing Figures

LIQUID COOLING OF AN ELECTRIC MACHINE ROTOR WINDING

Field of the Invention

The present invention relates to electric machine engineering, and more particularly, to devices for liquid cooling of electric machine rotor winding.

The device for liquid cooling can be advantageously used in turbo-generators with a self-pumping system of rotor winding liquid cooling.

BACKGROUND OF THE INVENTION

Known in the prior art are devices for liquid cooling of rotor winding, using forced liquid supply, where a liquid flow is forced through the hollow conductors of the winding by a pump.

The devices for rotor winding liquid cooling with a forced liquid supply suffer from the following disadvantages:

axial channels are required in the rotor shaft to supply the liquid, the liquid supply channels hampering the current supply to the rotor winding which is also accomplished through the axial channels provided in the rotor shaft;

an anticorrosive protection of the surface of liquid supply channels is required;

a mechanical coupling is required between the rotor shaft and the winding via a water-conducting means. Such a mechanical coupling produces alternating forces in the water-conducting means due to a difference in stiffnesses of the rotor body and the rotor shaft tail portion, this decreasing the reliability of the water-conducting means;

a high pressure (up to 200 kg/cm$^2$) of the cooling liquid in winding channels, reducing the reliability of soldered joints in the winding.

Free from the above-mentioned disadvantages are rotor winding liquid cooling devices using a self-pumping liquid cooling system.

The self-pumping liquid cooling devices for rotor winding are known wherein the liquid circulates through the winding due to a centrifugal head generated in the rotating rotor because of a difference between the radial levels of the supplied and collected liquid.

Known also in the prior art are self-pumping liquid cooling devices for rotor winding, comprising a means for supplying the cooling liquid to the rotor winding and a means for collecting the cooling liquid. The latter is formed by an external cylindrical member fastened to the rotor and by a stationary internal cylindrical member, both members being arranged concentrically with the shaft. The cooling liquid collecting chamber is disposed in the clearance between the external and internal cylindrical members (cf. USSR Author's Certificate No. 236610, Cl. H02K 9/193, 1969).

The disadvantage of this device consists in that the cooling liquid is discharged unobjected from the external cylindrical member rotating with the rotor into a stationary collecting chamber, the cooling liquid discharged at a high speed being strongly splashed, which hampers a reliable sealing of the chamber from the internal cavity of the stator. In addition, an excessive pressure produced in the collecting chamber by rotating rotor members which pump air into the liquid collecting chamber, thus not allowing to provide a reliable sealing of the chamber from the internal cavity of the stator and reducing the reliability of the electric machine.

Partially free from the above-mentioned disadvantage is the device for liquid cooling of rotor winding of an electric machine, specifically a turbo-generator, with a self-pumping liquid cooling system, comprising a means for supplying the cooling liquid into the rotor winding and a means for collecting the cooling liquid. The latter is formed by an external cylindrical member having an annular recess on its internal surface and fastened to the rotor, and by a stationary internal cylindrical member, both members being arranged concentrically relative to the shaft. On the winding side of the external surface of the internal cylindrical member an annular projection is formed, extending into the annular recess made on the internal surface of the external cylindrical member. As the device operates, the annular projection of the internal cylindrical member and the annular recess of the external cylindrical member form a hydraulic seal protecting the liquid collecting chamber against the penetration of air that can be drawn by liquid splashes into the internal space of electric machine stator via the labyrinth packing, which cannot be tolerated. The cooling liquid collecting chamber is disposed in the clearance between the external and internal cylindrical members behind the annular projection, on the side opposite to the rotor winding (cf. USSR Author's Certificate No. 253,219, Cl. H02K, 1969).

The disadvantage of the device described hereinabove is a free discharge of the cooling liquid from the external cylindrical member rotating with the rotor into the stationary liquid collecting chamber, which is accompanied by a strong splashing of the cooling liquid discharged into the liquid collecting chamber at a high speed, thus hampering a reliable sealing of this chamber from the internal cavity of the stator and reducing the reliability of the electric machine, since the liquid can penetrate into the internal space of the stator.

SUMMARY OF THE INVENTION

It is an object of the present invention to improve the reliability of an electric machine by preventing the cooling liquid penetration into the internal space of the stator.

With this and other objects in view, there is proposed a device for liquid cooling of an electric machine rotor winding, comprising a means for supplying a cooling liquid into the rotor winding, a liquid collecting chamber, and a means for discharging the cooling liquid into the liquid collecting chamber, formed by an external cylindrical member having an annular recess on its internal surface and fastened to a rotor, and by a stationary internal cylindrical member having an annular projection on its external surface on a winding side, extending into the annular recess of the external cylindrical member, both members being arranged concentrically with a rotor shaft, wherein, according to the invention, in the annular projection of the internal cylindric member there is provided at least one internal annular cavity open on a circumference on the projection and communicating with the liquid collecting chamber, the liquid collecting chamber being formed in the stationary internal cylindrical member.

The internal annular cavity in the annular projection, open on the circumference thereof and communicating with the liquid collecting chamber, allows the cooling liquid flow rotating with the external cylindrical member to penetrate thereinto and provides a friction of an annular flow of said cooling liquid against walls of the annular cavity.

Owing to this friction, the annular flow of the cooling liquid is braked by the annular cavity walls and its angular speed of rotation is reduced. This leads to a reduction in the liquid pressure inside the cavity caused by centrifugal forces, and, hence, to a continuous circulation of the cooling liquid due to the difference of liquid pressure on the internal surface of the external cylindrical member and in the interior of the annular cavity. The separate arrangement of the liquid collecting chamber from the means for discharging the cooling liquid prevents the high-speed discharge of the cooling liquid into the clearance between the external and internal cylindrical members beyond the annular projection. This prevents, in turn, a strong splashing of the cooling liquid in this clearance and, hence, the penetration thereof into the internal space of the stator.

A plurality of annular cavities formed in the annular projection increases the flow rate of the means for discharging the cooling liquid into the liquid collecting chamber and reduces the probability of entrapment of the discharged liquid beyond the annular recess of the external cylindrical member in course of the device operation and, hence, the probability of penetration of the liquid into the internal space of the stator.

It is advisable to provide projections on the side walls of the annular cavity in order to increase the resistance to the flow. This contributes to a quicker braking of the cooling liquid flow inside the cavity and, therefore, to a higher difference between the liquid pressure on the internal surface of the external cylindrical member and in the interior of the annular cavity, thus increasing the flow rate through the device.

It is also advisable to stagger the projections on the opposite walls of the annular cavity around its periphery. Such an angular shift of the projections disposed on the opposite walls of the annular cavity with respect to each other contributes to a quick and smooth braking of the cooling liquid flow inside the cavity due to formation of vortexes in the liquid flow entering the annular cavity and, hence, assures a higher errosion resistance of the annular cavity, without reducing the flow rate of the cooling liquid, through the device.

It is also advisable to make the annular cavity expanded toward the rotor shaft. Such a design of the annular cavity prevents any reduction in the flow rate of the liquid cooling through the device by compensating the reduction in the annular cavity cross-section as the flow moves radially toward shorter radii of the annular cavity. Furthermore, if the angle of annular cavity expansion exceeds the value corresponding to the complete compensation of the reduction in the cross-section of the said annular cavity for the flow moving radially toward shorter radii, an additional increase in the flow rate of the liquid cooling through the device takes place.

The proposed device for liquid cooling of electric machine rotor winding according to the invention is more reliable than other known liquid cooling devices, since it prevents the penetration of the cooling liquid into the internal space of the stator.

These and other objects and advantages of the present invention will become fully apparent from the following description taken in conjunction with the accompanying drawings, wherein:

DETAILED DESCRIPTION OF THE INVENTION

Figure 1:
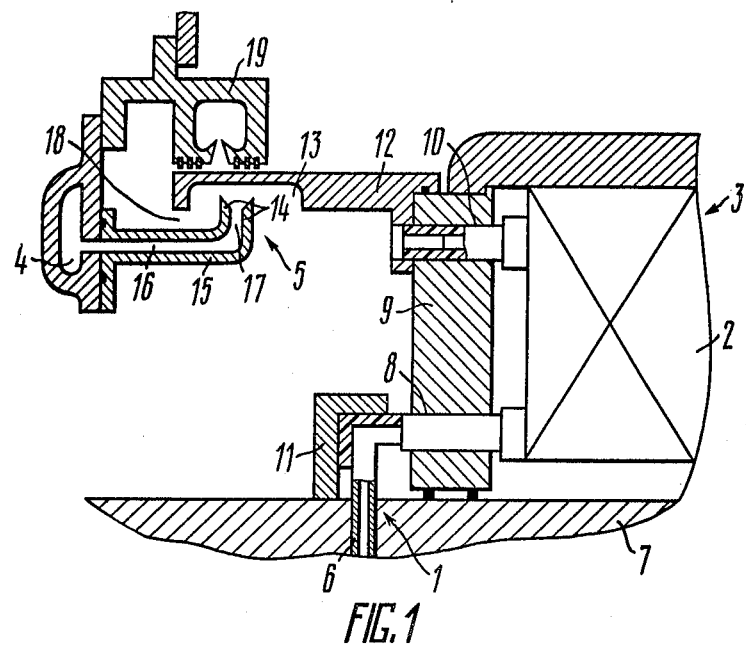
FIG. 1 is a longitudinal section of a device for liquid cooling of an electric machine rotor winding, according to the invention.

Referring now to the drawings, FIG. 1 shows a device for liquid cooling of an electric machine rotor winding, comprising a means 1 for supplying a cooling liquid into a winding 2 of a rotor 3, a liquid collecting chamber 4, and a means 5 for discharging the cooling liquid into the liquid collecting chamber 4. The means 1 for supplying the cooling liquid includes insulated metallic pipes 6 interconnecting water-conducting axial channels (not shown) in a shaft 7 of the rotor 3 with lead-outs (not shown) of the winding 2 of the rotor 3 through holes 8 in a ring 9. Furthermore, the ring 9 is provided with holes 10 for draining the cooling liquid into the means 5 for discharging the cooling liquid. Fastened to the shaft 7 of the rotor 3 is a ring member 11 retaining the metallic pipes 6 against displacement under the action of centrifugal forces.

The cooling liquid discharging means 5 is of the following construction. The rotor 3 carries an external cylindrical member 12 fastened thereto and arranged concentrically with its shaft 7. The cylindrical member 12 is provided with an annular recess 13 on the internal surface thereof facing the shaft 7. The annular recess 13 accommodates an annular projection 14 of a stationary internal cylindrical member 15 also arranged concentrically with the shaft 7 of the rotor 3 and provided with axial channels 16 passing throughout the circumference thereof. In the annular projection 14 an internal annular cavity 17 of a constant width is formed, open on the circumference of the projection 14 and communicating with the liquid collecting chamber 4 via the axial channels 16. A cavity 18 in the clearance between the external cylindrical member 12 and the internal cylindrical member 15 behind the annular projection 14 is separated from the interior of the stator (not shown) by labyrinth packings 19.

Figure 2:
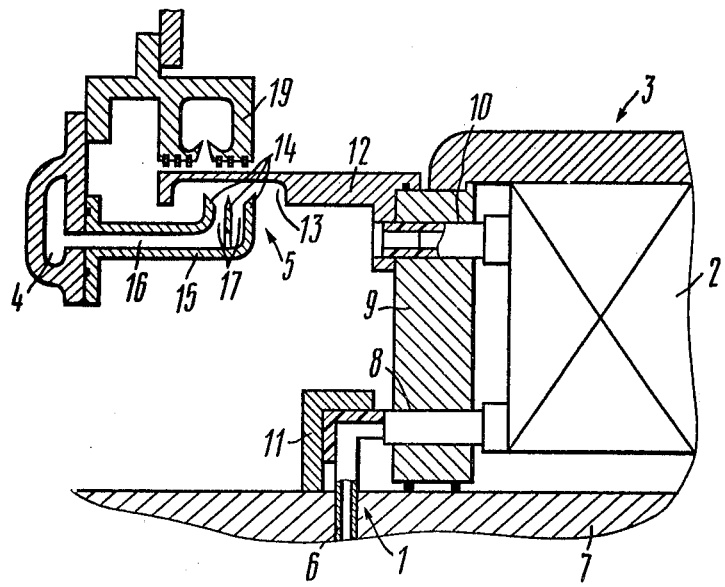
FIG. 2 is a longitudinal section of an embodiment of a device for liquid cooling having two internal annular cavities in the annular projection of the internal cylindrical member.

In another embodiment of a device for liquid cooling of an electric machine rotor winding, the annular projection 14 (FIG. 2) of the stationary internal cylindrical member 15 is provided with two internal annular cavities 17 open on the circumference of the projection 14, both annular cavities 17 being interconnected and connected with the liquid collecting chamber 4 via the axial channels 16.

In accordance with still another embodiments of the invention, the annular projection 14 can be provided with a plurality of internal annular cavities 17 open on the circumference of the projection 14, all the annular cavities 17 mentioned hereinbefore being interconnected and connected with the liquid collecting chamber 4 via the axial channels 16. Such a design of the means 5 for discharging the cooling liquid increases the flow rate therethrough, this reducing the probability of penetration of the cooling liquid being discharged beyond the annular recess 13 of the external cylindrical member 12 in course of operation and, hence, that of entrapment of the liquid into the interior of the stator.

Figure 3:
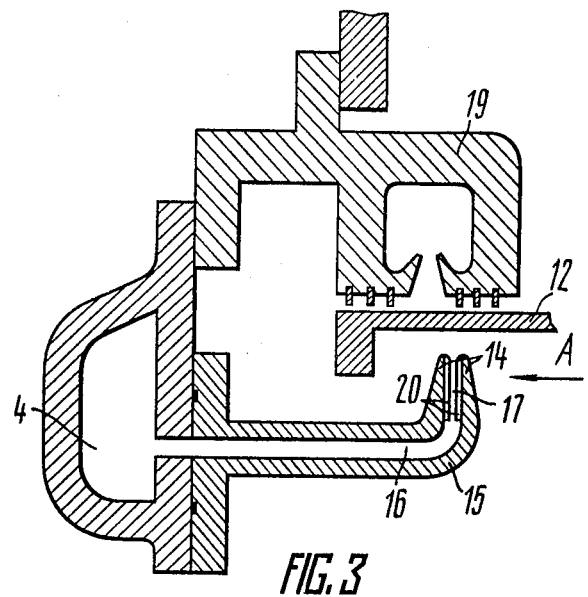
FIG. 3 is an enlarged longitudinal section of an embodiment of a means for discharging the cooling liquid, according to the invention.
Figure 4:
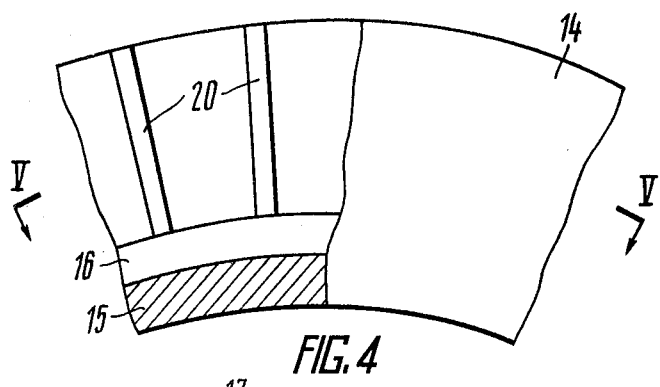
FIG. 4 is a view along the arrow A of FIG. 3.
Figure 5:
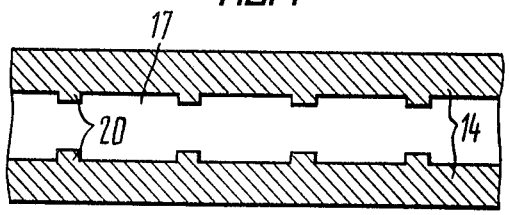
FIG. 5 is a sectional view as seen in the line V—V of FIG. 4.

In still another embodiment of the invention, projections 20 are provided on the side walls of the annular cavity 17 (FIGS. 3, 4, 5).

The projections 20 on the side walls of the annular cavity 17 assist in quick braking of a cooling liquid flow inside the cavity 17 and, as a result, provide a higher difference between the liquid pressure on the internal surface of the external cylindrical member and in the interior of the annular cavity and increases the flow rate of the cooling liquid through the discharging means.

Figure 6:
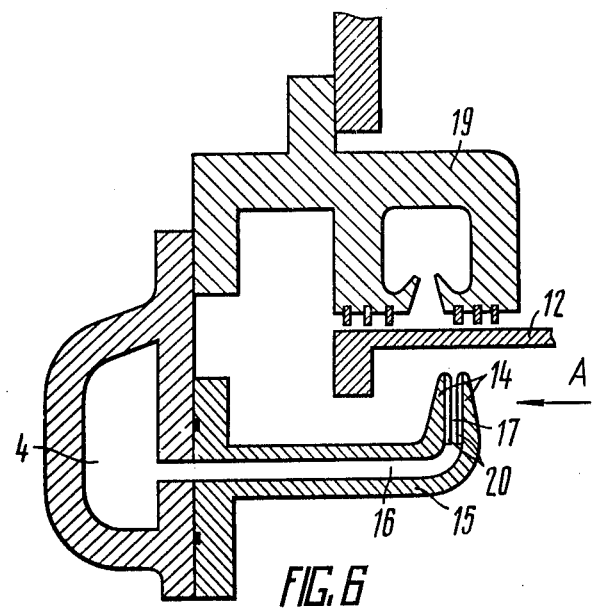
FIG. 6 is an enlarged longitudinal section of another embodiment of a means for discharging the cooling liquid, according to the invention.
Figure 7:
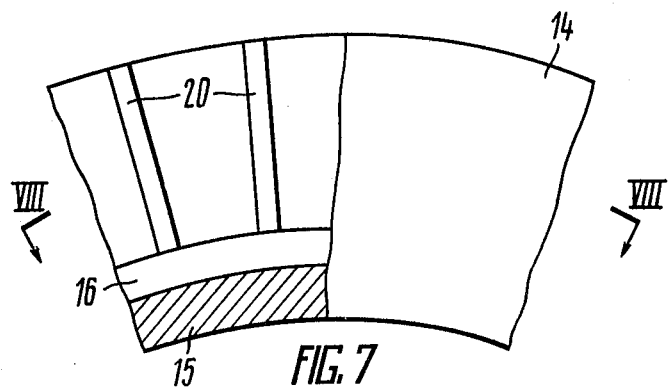
FIG. 7 is a view along the arrow A of FIG. 6.
Figure 8:
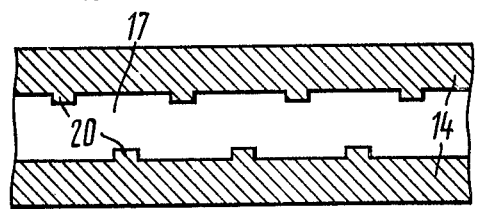
FIG. 8 is a sectional view as seen on the line VIII—VIII of FIG. 7.

In the embodiment of the invention shown in FIGS. 6, 7, 8 the projections 20 arranged on the side walls of the annular cavity 17 are staggered around its periphery. Such a construction enables a quick and smooth braking of the cooling liquid flow inside the annular cavity 17 due to vortexes produced in the liquid flow entering the annular cavity 17 and, hence, provides for a higher errosion resistance of the annular cavity 17 and the projections 20, not reducing the flow rate of the cooling liquid.

Figure 9:
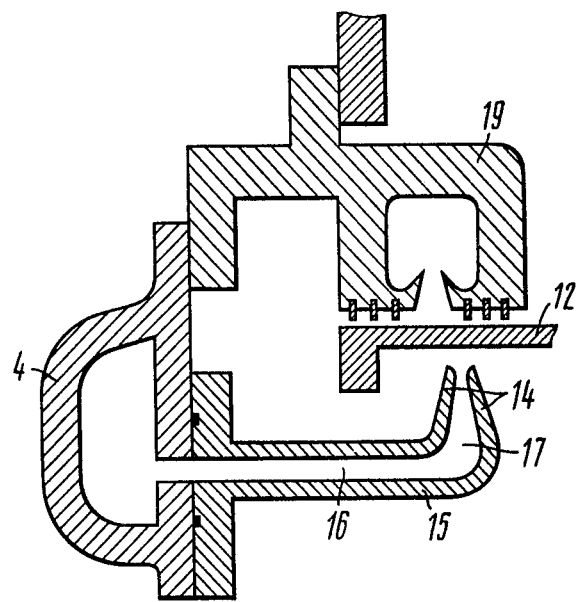
FIG. 9 is an enlarged longitudinal section of still another embodiment of a means for discharging the cooling liquid, according to the invention.

In the embodiment of the invention shown in FIG. 9 the annular cavity 17 is expanded toward the shaft 7 (FIG. 1) of the rotor 3. Such a construction of the annular cavity 17 prevents the reduction in the flow rate of the liquid cooling through the device due to compensation of reduction in the cross-section of the annular cavity 17 as the flow moves radially toward smaller radii of the annular cavity 17. Furthermore, if the angle of expansion of the annular cavity 17 exceeds the value corresponding to the complete compensation of reduction in the cross-section of the annular cavity as the flow moves radially toward smaller radii, an additional increase in the flow rate of the liquid cooling through the device takes place.

The proposed device for liquid cooling of electric machine rotor winding operates as follows.

As the rotor 3 (FIG. 1) rotates, the cooling liquid is drawn by centrifugal forces into the winding 2 of the rotor 3 via the insulated metallic pipes 6 and the holes 8 in the ring 9 and is discharged from the winding 2 via the holes 10 in the ring 9, then it flows along the internal surface of the external cylindrical member 12 fastened to the rotor 3 and fills the annular recess 13, the angular speed of rotation of the cylindrical member 12 and that of the cooling liquid layer in the annular recess 13 being the same.

As the annular recess 13 is filled, the cooling liquid comes in contact with the external surface of the annular projection 14 of the internal stationary cylindrical member 15, forming a hydraulic seal, and penetrates into the annular cavity 17.

The liquid flow in the annular cavity 17 is braked by friction against the cavity walls, the angular speed of rotation of this flow is decreased, and, hence, the pressure produced therein by centrifugal forces is reduced respectively.

The difference between the pressure in the annular recess 13 and in the annular cavity 17 causes a continuous circulation of the liquid from the annular recess 13 to the annular cavity 17 and further via the axial channels 16 to the liquid collecting chamber 4.

Thus, the liquid circulation is caused by the difference of heads produced by centrifugal forces in annular layers of rotating liquid in the annular recess 13 and in the annular cavity 17.

When the rotor 3 stops and the action of the centrifugal forces is discontinued, the cooling liquid flow via the winding 2 of the rotor 3 is also discontinued. The liquid residues located in the annular recess 13 are drained from the external cylindrical member 12 into the cavity 18 in the clearance between the external cylindrical member 12 and the internal cylindrical member 15 behind the annular projection 14. The packings 19 do not allow the liquid penetration into the interior of the stator.

If the annular projection 14 (FIG. 2) has two internal annular cavities 17, the rate of braking of the liquid flow against the walls of the cavities increases, whereby the angular speed of rotation of this flow is more sharply reduced, this leading ultimately to an increase in the speed of continuous flow circulation via the annular cavities 17 and reducing the probability of penetration of liquid into the cavity 18.

In case the projections 20 are provided on the side walls of the annular cavity 17 (FIGS. 3, 4, 5), the rate of the flow braking increases, this leading, in turn, to an increase in the speed of continuous flow circulation via the cavity 17 and reducing the probability of entrapment of liquid into the cavity 18.

If the projections 20 (FIGS. 6, 7, 8) on the side walls of the annular cavity 17 are staggered around the periphery thereof, the cooling liquid flow inside the annular cavity 17 is braked quickly and smoothly due to vortexes generated in the flow, thus ensuring a higher errosion resistance of the annular cavity 17 and the projections 20.

If the annular cavity 17 (FIG. 9) is expanded toward the shaft 7 (FIG. 1) of the rotor 3, the cooling liquid flow passes through approximately equal cross-sections of the annular cavity 17 along the entire path thereof, as it moves radially in the cavity 17.

While particular embodiments of the invention have been shown and described, various modifications thereof will be apparent to those skilled in the art and therefore it is not intended that the invention be limited to the disclosed embodiments or to the details thereof and the departures may be made therefrom within the spirit and scope of the invention as defined in the appended claims.

What is claimed is:

1. A device for collecting discharged cooling liquid from axial outlet passages of a rotor winding of an electric machine, having means for supplying a cooling liquid to the rotor winding, said supply means being connected by axial inlet passages with said winding, and means for discharging the cooling liquid into a drain cavity, said discharge means being in communication with axial outlet passages of said winding, said discharge means comprising an outer cylindrical member having an annular recess on the inner surface thereof attached to the rotor and mounted concentrically with the rotor shaft, a stationary inner cylindrical member mounted in concentric relation with the rotor shaft, said inner cylindrical member having on its outer surface an annular projection engaging the annular recess of said outer cylindrical member and having at least one inner annular cavity open at the outer diameter of the annular projection, and a drain cavity provided in said inner cylindrical member and communicating with the inner annular cavity.

2. A device according to claim 1, further comprising projections arranged on the side walls of said annular cavity to increase a resistance to the liquid flow.

3. A device according to claim 2, wherein said projections on the opposite side walls of said annular cavity are staggered around the periphery thereof.

4. A device according to claim 2 or 3 or 1, wherein said annular cavity is expanded toward said rotor shaft.

* * * * *